United States Patent
Ordille et al.

(10) Patent No.: US 9,779,231 B2
(45) Date of Patent: Oct. 3, 2017

(54) DISTRIBUTION OF EPHEMERAL EXTENSION TO COMMUNICATION SESSIONS

(71) Applicant: Avaya Inc., Santa Clara, CA (US)

(72) Inventors: Joann Ordille, Lebanon, NJ (US);
Anjur Sundaresan Krishnakumar, Princeton, NJ (US); Shalini Yajnik, Berkeley Heights, NJ (US)

(73) Assignee: Avaya Inc., Santa Clara, CA (US)

( * ) Notice: Subject to any disclaimer, the term of this patent is extended or adjusted under 35 U.S.C. 154(b) by 89 days.

(21) Appl. No.: 14/504,143

(22) Filed: Oct. 1, 2014

(65) Prior Publication Data
US 2015/0235021 A1    Aug. 20, 2015

Related U.S. Application Data

(60) Provisional application No. 61/941,924, filed on Feb. 19, 2014.

(51) Int. Cl.
H04L 29/06 (2006.01)
G06F 21/45 (2013.01)
(Continued)

(52) U.S. Cl.
CPC ............ *G06F 21/45* (2013.01); *H04L 63/08* (2013.01); *H04L 63/0846* (2013.01);
(Continued)

(58) Field of Classification Search
None
See application file for complete search history.

(56) References Cited

U.S. PATENT DOCUMENTS

| 6,427,170 B1 * | 7/2002 | Sitaraman ......... H04L 29/12066 709/226 |
| 7,542,561 B1 * | 6/2009 | Jabbour ............. H04M 3/5232 379/265.01 |

(Continued)

FOREIGN PATENT DOCUMENTS

EP        2109301        10/2009

*Primary Examiner* — Malcolm Cribbs
(74) *Attorney, Agent, or Firm* — Sheridan Ross P.C.

(57) ABSTRACT

To allow more non-enterprise communication endpoints to communicate without having to allocate an extension for every non-enterprise communication endpoint, a request is received to communicate with an enterprise communication system from a non-enterprise communication endpoint. A temporary password is associated with a dynamic communication address (e.g., from a group of dynamic extensions). The temporary password and the dynamic communication address are sent to the non-enterprise communication endpoint. The non-enterprise communication endpoint registers with the communication system using the temporary password and the dynamic communication address. A communication session is established between the non-enterprise communication endpoint and an enterprise communication endpoint using the dynamic communication address. The temporary password is then disassociated from the dynamic communication address, thus freeing up the dynamic communication address for use with another non-enterprise communication endpoint.

20 Claims, 5 Drawing Sheets

(51) Int. Cl.
*H04M 1/725* (2006.01)
*H04M 3/51* (2006.01)
*H04M 3/54* (2006.01)
*H04M 3/58* (2006.01)
*H04W 4/00* (2009.01)
*H04W 4/16* (2009.01)
*H04M 3/42* (2006.01)

(52) U.S. Cl.
CPC ..... *H04M 1/72525* (2013.01); *H04M 3/4234* (2013.01); *H04M 3/5183* (2013.01); *H04M 3/54* (2013.01); *H04M 3/58* (2013.01); *H04W 4/008* (2013.01); *H04W 4/16* (2013.01)

(56) References Cited

U.S. PATENT DOCUMENTS

| | | | | |
|---|---|---|---|---|
| 7,944,870 B2* | 5/2011 | Varland | ............... | H04W 8/26 370/313 |
| 2002/0026366 A1* | 2/2002 | Ohtsuki | ............ | G05B 19/0421 705/16 |
| 2003/0232623 A1* | 12/2003 | Balasuriya | ........... | H04W 8/186 455/507 |
| 2005/0169288 A1* | 8/2005 | Kamiwada | ........ | H04L 29/12009 370/401 |
| 2008/0037764 A1* | 2/2008 | Lee | ........................ | H04M 3/12 379/266.01 |
| 2008/0130647 A1* | 6/2008 | Ohba | ................. | H04L 61/2015 370/392 |
| 2009/0113528 A1* | 4/2009 | Ananda | ............... | H04L 63/0823 726/5 |
| 2009/0196290 A1* | 8/2009 | Zhao | ................. | H04L 29/12811 370/392 |
| 2010/0296441 A1* | 11/2010 | Barkan | ................. | H04W 12/08 370/328 |
| 2011/0282931 A1* | 11/2011 | Chen | ................... | H04L 29/1216 709/203 |
| 2012/0096184 A1* | 4/2012 | Lambert | ........... | H04L 29/12254 709/245 |
| 2012/0224536 A1* | 9/2012 | Hahn | ..................... | H04L 45/00 370/328 |
| 2013/0212653 A1* | 8/2013 | Hoghaug | ................ | G06F 21/34 726/5 |
| 2013/0342325 A1* | 12/2013 | Wang | .................... | G06K 19/06 340/10.1 |
| 2014/0047526 A1* | 2/2014 | Huang | ................. | H04L 63/083 726/7 |
| 2014/0376029 A1 | 12/2014 | Itoh | | |

* cited by examiner

DISTRIBUTION OF EPHEMERAL EXTENSION TO COMMUNICATION SESSIONS

CROSS REFERENCE TO RELATED APPLICATIONS

This application claims the benefit under 35 U.S.C. §119 (e) of U.S. Provisional Application No. 61/941,924, filed Feb. 19, 2014, entitled "CUSTOMER SERVICE KIOSK FOR BYOD" the entire disclosure of which is incorporated herein by reference.

TECHNICAL FIELD

The systems and methods disclosed herein relate to communication systems and in particular to managing communication systems.

BACKGROUND

Customers can interact with contact center agents using various communication devices, such as, telephones, mobile telephones, video phones, kiosks, Instant Messaging (IM) clients, soft clients, and/or the like. By directing calls to a contact center, a customer can receive expertise that may not be available locally (e.g., at a local store). Utilization of a contact center can also reduce the work load on local staff. However, these types of solutions work only for communication sessions that are initiated by the customer over established public communication networks such as phone calls on the Public Switched Telephone Network (PSTN), Instant Messaging (IM) on an established public IM platform, etc. There are situations where the use of such public networks lacks functionality. For example, the PSTN does not carry video or the public network is unmanageable to the enterprise (requires connections to publicly administered, and possibly unsecure, SIP proxies). In these cases, the enterprise may wish to forego the public services and, instead, extend some services of its internal communication network to non-enterprise users, on a temporary basis, both for the purpose of receiving communication sessions and initiating communication sessions.

One way to solve this problem is to assign known credentials and an extension to the customer's communication device. When the customer wants to establish a communication session with the contact center agent, the customer logs into the communication system using the credentials on the customer's device. However, if the communication device is provided the credentials on a permanent basis, the credentials can be maliciously used for communications unrelated to the contact center, such as long distance dialing and denial of service attacks. In addition, an inordinate amount of extensions have to be managed within the contact center. The number of extensions required can easily exceed the capacity of the contact center, thus resulting in expensive hardware/software upgrades to manage the necessary extensions.

SUMMARY

Systems and methods are provided to solve these and other problems and disadvantages of the prior art. To allow more non-enterprise communication endpoints to communicate without having to permanently allocate an extension for every non-enterprise communication endpoint, a request is received to communicate with an enterprise communication system from a non-enterprise communication endpoint. A temporary password is associated with a dynamic communication address (e.g., from a group of dynamic extensions). The temporary password and the dynamic communication address are sent to the non-enterprise communication endpoint. The non-enterprise communication endpoint registers with the communication system using the temporary password and the dynamic communication address. A communication session is established between the non-enterprise communication endpoint 102A and an enterprise communication endpoint using the dynamic communication address. The temporary password is then disassociated from the dynamic communication address, thus freeing up the dynamic communication address for use with another non-enterprise communication endpoint or the same non-enterprise communication endpoint at a later point in time.

This process can be used to provide enhanced customer support services. For example, the above system can be used in a contact center to support customer interactions with the contact center as described in U.S. patent application Ser. No. 14/308,515, which is incorporated herein in its entirety by reference.

DETAILED DESCRIPTION

Figure 1:
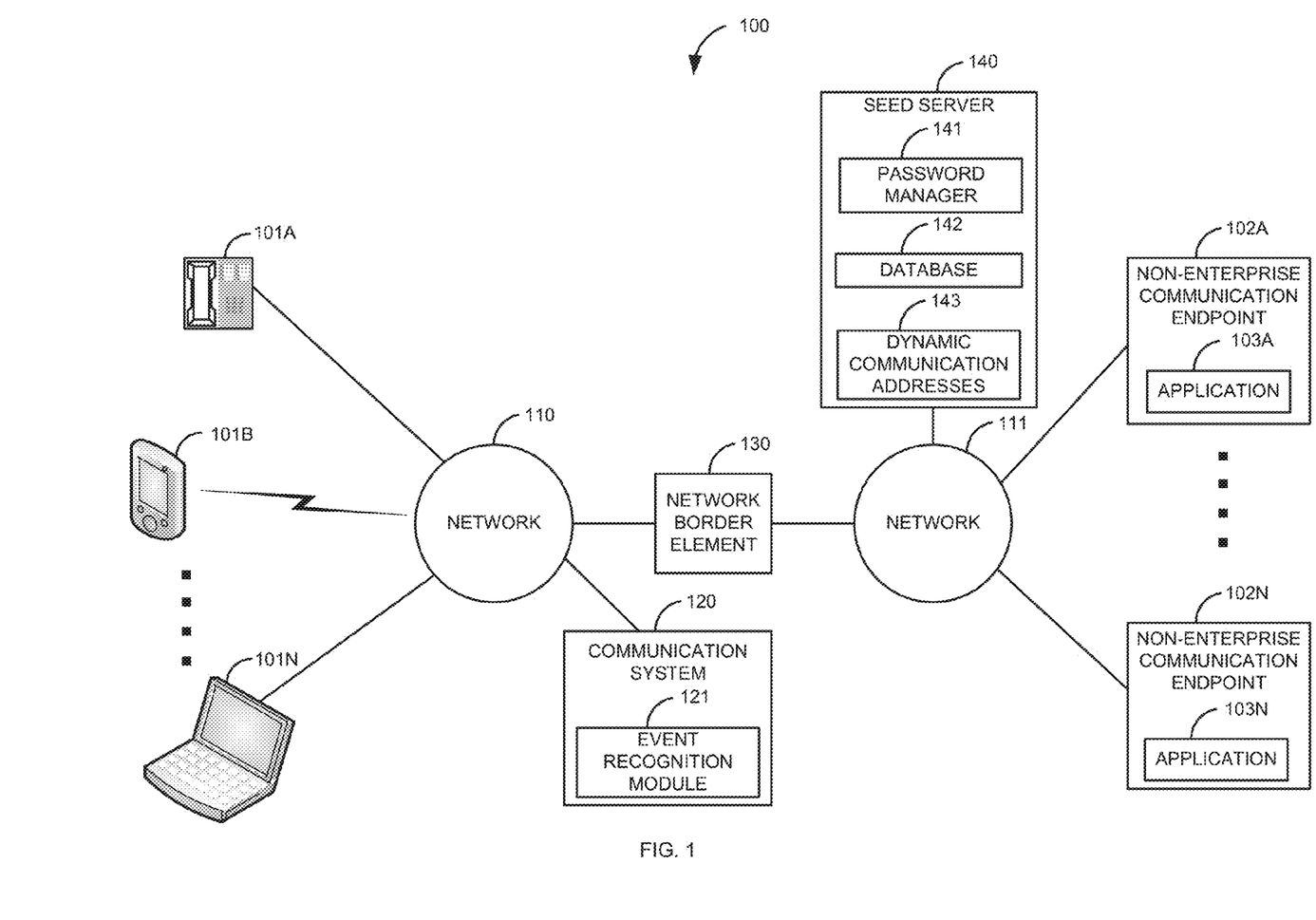
FIG. 1 is a block diagram of a first illustrative system for assigning dynamic communication addresses for communication sessions.

FIG. 1 is a block diagram of a first illustrative system 100 for assigning dynamic communication addresses 143 for communication sessions. The first illustrative system 100 comprises enterprise communication endpoints 101A-101N, non-enterprise communication endpoints 102A-102N, a network 110, a network 111, a communication system 120, a network border element 130, and a seed server 140.

The enterprise communication endpoints 101A-101N can be or may include any device that can communicate on the network 110, such as a Personal Computer (PC), a telephone, a video phone, a cellular telephone, a smartphone, a Personal Digital Assistant (PDA), a tablet device, a notebook device, and the like. As shown in FIG. 1, any number of enterprise communication endpoints 101A-101N may be connected to the network 110, including only a single enterprise communication endpoint 101. In addition, the enterprise communication endpoints 101A-101N may be directly connected to the communication system 120. In one embodiment, the enterprise communication endpoints 101A-101N are communication endpoints for use by human agents in a contact center.

The non-enterprise communication endpoints 102A-102N can be or may include any device that can communicate on the network 111, such as a Personal Computer (PC), a telephone, a video phone, a cellular telephone, a smartphone, a Personal Digital Assistant (PDA), a tablet device, a notebook device, and the like. As shown in FIG. 1, any number of non-enterprise communication endpoints 102A-102N may be connected to the network 111, including only a single non-enterprise communication endpoint 102.

The non-enterprise communication endpoints 102A-102N further comprise applications 103A-103N. The applications 103A-103N can be any software installed on the non-enterprise communication endpoints 102A-102N, such as a soft client, a soft phone, a downloadable application, and/or the like.

The network 110 can be or may include any collection of communication equipment that can send and receive electronic information, such as, a Wide Area Network (WAN), a Local Area Network (LAN), a Voice over IP Network (VoIP), a packet switched network, a circuit switched network, a cellular network, a combination of these, and the like. The network 110 can use a variety of protocols, such as Ethernet, Internet Protocol (IP), Session Initiation Protocol (SIP), H.323, video protocols, Instant messaging protocols, text messaging protocols, Integrated Services Digital Network (ISDN), and/or the like. The network 110 is an enterprise network, such as a network for a company or organization.

The network 111 can be or may include any collection of communication equipment that can send and receive electronic information, such as the Internet, a WAN, a LAN, a Voice over IP Network, the Public Switched Telephone Network (PSTN), a packet switched network, a circuit switched network, a cellular network, a combination of these, and the like. The network 111 can use a variety of protocols, such as Ethernet, IP, SIP, H.323, video protocols, Instant Messaging protocols, text messaging protocols, ISDN, and/or the like. The network 111 is typically a public network, such as the Internet. However, in some embodiments, the network 111 may be a private network, a Virtual Private Network (VPN), an overlay network, or the like.

The communication system 120 can be or may include any hardware/software that can manage electronic communications, such as a Private Branch Exchange (PBX), a session manager, a communication manager, a router, a central office switch, and/or the like. The communication system 120 can be a communication system 120 for a contact center. The communication system 120 controlled by the enterprise.

The communication system 120 further comprises an event recognition module 121. The event recognition module 121 can be or may include any hardware/software that can recognize events in a communication session. A communication session can be a voice communication session, a video communication session, an Instant Messaging communication session, a text communication session, an email communication session, and/or the like.

The network border element 130 can be any hardware/software that can provide protection services for the network 110. For example, the network border element 130 can be or include a Network Address Translator (NAT), a Session Border Controller, a virus analyzer, a proxy server, and/or the like.

The seed server 140 can be any hardware/software that can manage communication sessions, such as a PBX, a server, a router, a proxy server, and/or the like. The seed server 140 further comprises a password manager 141, a database 142, and dynamic communication addresses 143. The seed server 140 may also be protected by a network boarder element 140, such as a firewall in between the network 111 and the seed server 140.

The password manager 141 can be any hardware/software that can manage and generated passwords for the communication system 120. The database 142 can be any hardware/software that can store information, such as a relational database, a Structured Query Language (SQL) database, a directory service, a hierarchical database, a flat file system, and/or the like. The database 142 is shown as part of the seed server 140. However, the database 142 may be wholly in the communication system 120 or distributed between the seed server 140 and the communication system 120.

The dynamic communication addresses 143 correspond to a pool, list, or collection of multiple addresses that can be dynamically assigned and unassigned to communication endpoints. The dynamic communication addresses 143 typically comprise enough communication addresses to handle a volume of active communication sessions with the non-enterprise communication endpoints 102A-102N. The number of dynamic communication addresses 143 can be any number of communication addresses, including a single dynamic communication address 143. The dynamic communication addresses 143 are communication addresses that are temporarily associated with a temporary password or temporarily associated with an enterprise communication endpoint 101. The dynamic communication addresses 143 are used by the password manager 141 to facilitate temporary yet authenticated communication sessions between a non-enterprise communication endpoint 102 and an enterprise communication endpoint 101. The dynamic communication address 143 may include a user name, password, a SIP domain, a SIP address, and/or the like.

Although the communication system 120 and the seed server 140 are shown as two separate devices/elements, some or all of the components of the seed server 140 may be included in the communication system 120 or vice versa. In such an embodiment, the communication system 120 with the seed server 140 functionality can be connected to the network 110 or the network 111. Alternatively, portions of the seed server 140 may be included or distributed between the communication system 120 and the seed server 140.

In another embodiment, the communication system 120 may be distributed between the networks 110 and 111. For example, part of the communication system 120 may be attached to the communication network 110 and part of the communication system 120 may be in a Demilitarized Zone (DMZ) between the network border element 130 and the network 111.

In another embodiment, the seed server 140 may be offered as part of a cloud computing service. In this embodiment, the seed server 140 is maintained by a service provider of the cloud computing service.

Figure 2:
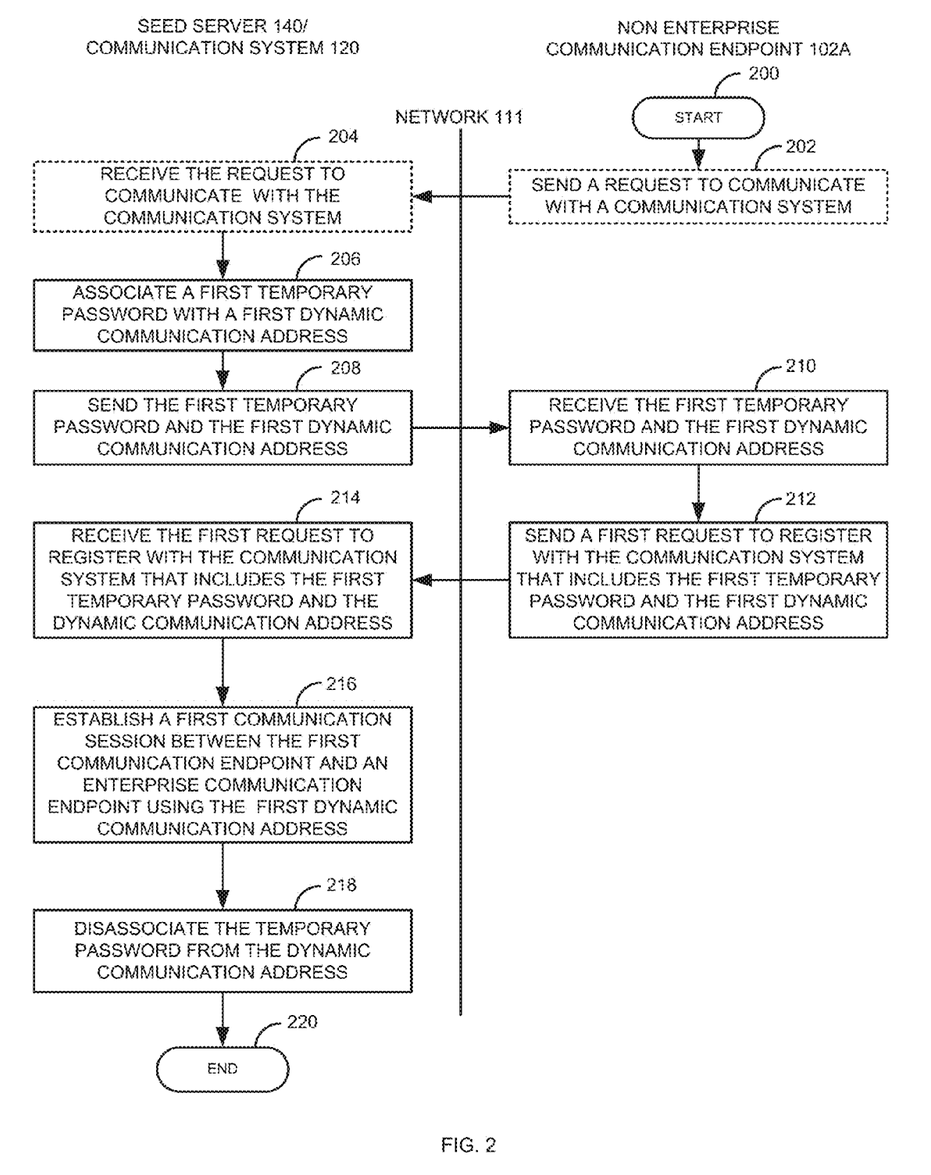
FIG. 2 is a flow diagram of a process for assigning dynamic communication addresses for communication sessions.

FIG. 2 is a flow diagram of a process for assigning dynamic communication addresses 143 for communication sessions. Illustratively, the enterprise communication endpoints 101A-101N, the non-enterprise communication endpoints 102A-102N, the applications 103A-103N, the communication system 120, the event recognition module 121, the network border element 130, the seed server 140, the password manager 141, and the database 142 are stored-program-controlled entities, such as a computer or processor, which performs the method of FIGS. 2-5 and the processes described herein by executing program instructions stored in a tangible computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The application 103A can optionally send, to the password manager 141, a request to communicate with the communication system 120 in step 202. The password manager 141 can optionally receive the request, from the application 103A, to communicate with the communication system 120 in step 204. Steps 202 and 204 are optional because the password manager 141 may start the process beginning with step 206.

The password manager 141 associates a first temporary password with a first dynamic communication address 143 in step 206. A temporary password can be any type of password that is not intended to be used for a long period of time. In one embodiment, the temporary password is derived based on input from a random number generator. Alternatively, the temporary password may be generated based on a specific algorithm. In FIG. 2, the first temporary password is associated with the dynamic address 143 after receiving the request in step 204. However, in other embodiments, the first temporary password can be associated with the dynamic communication address 143 prior to step 204. For example, the password manager 141 may pre-allocate group of temporary passwords with a group of dynamic communication addresses 143 prior to steps 202-204 (e.g., during initialization of the seed server 140). In one embodiment, the password manager 141 associates a new temporary password with a dynamic communication address 143 when the dynamic communication address 143 is disassociated from the previous temporary password (in step 218).

The password manager 141 sends the first temporary password and the first dynamic communication address 143 to the non-enterprise communication endpoint 102A in step 208. The application 103A in the non-enterprise communication endpoint 102A receives the first temporary password and the first dynamic communication address 143 in step 210. The application 103A sends a first request to the communication system 120 to register with the communication system 120 in step 212. The first request includes the first temporary password and the first dynamic communication address 143.

The communication system 120 receives the first request from the non-enterprise communication endpoint 102A to register with the communication system 120 in step 214. The first request includes the first temporary password and the first dynamic communication address 143. The non-enterprise communication endpoint 102A is now a registered endpoint with the communication system 120 that has a valid communication address (the dynamic communication address 143). The communication system 120 establishes a first communication session between the non-enterprise communication endpoint 102A and the enterprise communication endpoint 101A in step 216. The first communication session uses the first dynamic communication address 143 in establishing the communication session between the enterprise communication endpoint 101A and the non-enterprise communication endpoint 102A. The password manager 141 disassociates the temporary password from the dynamic communication address 143 in step 218. The process then ends in step 220.

To illustrate, consider the following examples. Assume that the communication system 120 is a communication system 120 that is used to manage agents in a contact center. The application 103A is an application for contacting agents in the contact center. A customer has downloaded the application 103A onto his cellular telephone (102A). The customer, via a user interface in the application 103A, indicates that he is having a problem with Product X, which the contact center supports (among other products). In response, the application 103A sends the request to communicate with the communication system 120 (step 202) that indicates that the customer is having the problem with Product X. The password manager 141 receives the request (step 204) and associates a temporary password with a dynamic communication address 143 (step 206). The password manager 141 sends the temporary password and the dynamic communication address to the application 103A (step 208). The application 103A receives the temporary password and the dynamic communication address 143 (step 210). The application 103A sends the request to register with the communication system 120 (step 212). The communication system 120 receives the request (step 214). The communication system 120 can now establish a communication session between the non-enterprise communication endpoint 102A and any one of the enterprise communication endpoints 101A-101N (communication endpoints used by agents of the contact center). This is because the non-enterprise communication endpoint 102A appears like an enterprise communication endpoint 101 to the communication system 120.

An agent that services Product X becomes available. In response to the agent becoming available, the communication system 120 sends an outbound communication request (e.g., a Session Initiation Protocol (SIP) INVITE) to the application 103A to establish a voice communication session between the enterprise communication endpoint 101A (the agent's enterprise communication endpoint) and the non-enterprise communication endpoint 102A. The To field in the SIP INVITE includes the dynamic communication address 143 and the From field in the SIP INVITE has the communication address of the enterprise communication endpoint 101A (or no address). A voice communication session (it could also be a video communication session or a multimedia communication session) is established between the agent and the customer (step 216). Once the call is completed, the temporary password is disassociated from the dynamic communication address 143 (step 218). Thus, the dynamic communication address 143 is now available for a different call from a different customer or the same customer.

In another embodiment, once the non-enterprise communication endpoint 102A is registered with the communication system 120 (step 214), the application 103A initiates an Instant Messaging (IM) session by sending a SIP INVITE to the communication system 120 using the dynamic communication address 143 (in a SIP From field) to a global address of the contact center (in a SIP To field). The communication system 120 receives the IM session request. The communication system 120, based on the information provided by the Application 103A that indicates that the customer wants to discuss Product Z, directs the SIP INVITE to a queue in the contact center for servicing IM contacts for Product Z. The customer is eventually connected to an agent at the enterprise communication endpoint 101B (step 216). Once the IM session is established, the password manager 141 disassociates the temporary password from the dynamic communication address 143 (step 218). In some embodiments, the password manager 141 disassociates the temporary password from the dynamic communication address after the communication session ends. For example, SIP requires periodic re-registrations to keep the session alive.

Figure 3:
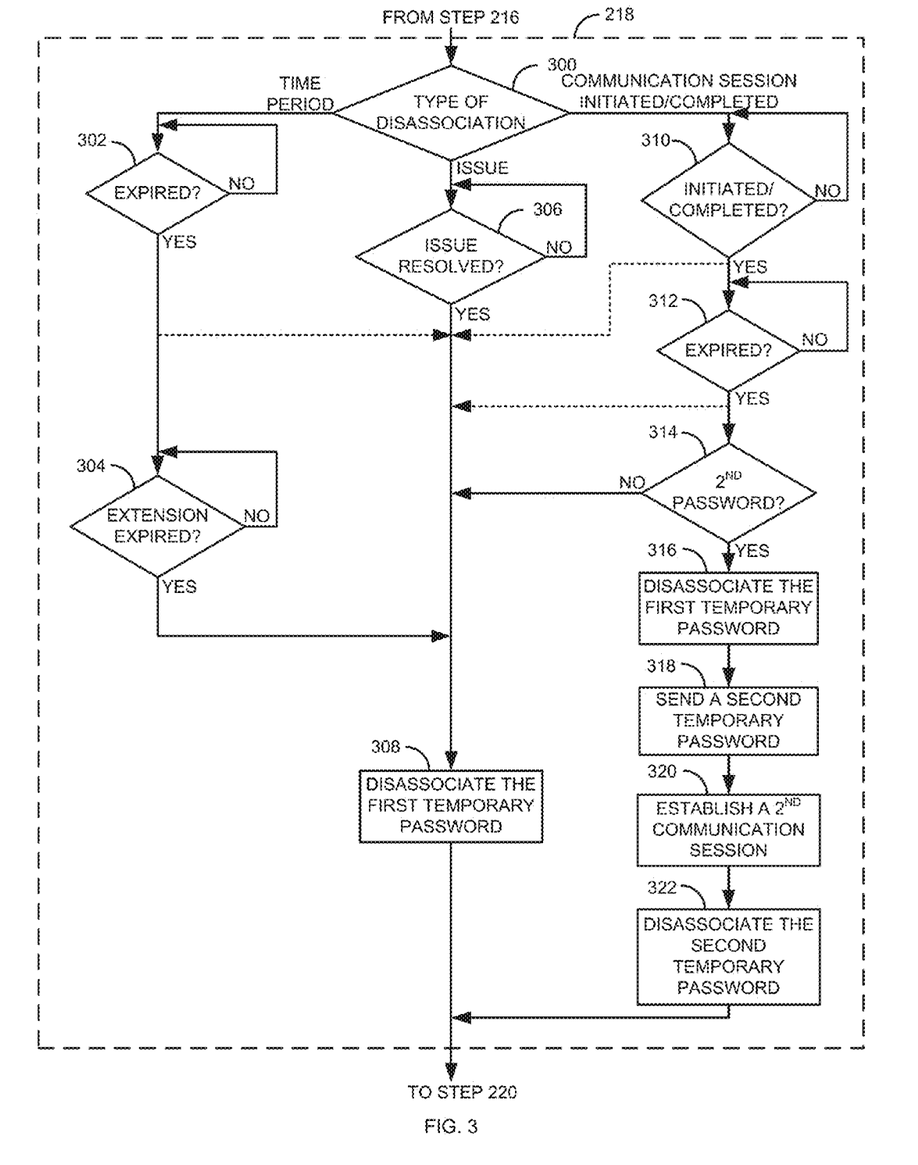
FIG. 3 is a flow diagram of a process for disassociating a temporary password from a dynamic communication address.

FIG. 3 is a flow diagram of a process for disassociating a temporary password from a dynamic communication address 143. FIG. 3 is an exemplary embodiment of step 218 of FIG. 2. After the communication session has been established in step 216, the password manager 141 determines when the first temporary password is disassociated from the first dynamic communication address 143 in step 300. How the first temporary password is disassociated from the first dynamic communication address 143 can vary based on how the password manager 141 is configured. The password manager 141 can be configured based on an administrative input, based on default values, and/or the like.

If the disassociation is based on a time period in step 300, the password manager 141 determines in step 302 if the time period has expired. If the time period has not expired in step 302, the process repeats step 302. Otherwise, if the time period has expired in step 302, the process goes to step 308 if the only option is based on the time period. For example, when the non-enterprise communication endpoint 102 registers with the communication system 120, the password manager 141 starts a timer for the time period. Once the timer expires, the temporary password is disassociated from the dynamic communication address 143 in step 308 regardless of whether the non-enterprise communication endpoint 102 has established a communication session or not. The process then goes to step 220.

In one embodiment, the non-enterprise communication endpoint 102 may be able to initiate or receive requests to establish any number of communication sessions during the time period. In another embodiment, the non-enterprise communication endpoint 102 may be only able to receive voice calls or be only able to make video calls or IM calls during the time period. In another embodiment, the non-enterprise communication endpoint 102 may be limited to a defined number of communication sessions during the time period (e.g., only limited to two communication sessions). After the temporary password is disassociated from the dynamic communication address 143 in step 308, the non-enterprise communication endpoint 102A will be unable to use the first temporary password to establish another communication session.

In another embodiment, an extension of time can be given to the initial time period in step 304. If the time period has expired in step 302, the password manager 141 determines if the extension of time has expired in step 304. If the extension has not expired in step 304, the process repeats step 304. If the extension of time has expired in step 304, the process disassociates the first temporary password from the dynamic communication address 143 in step 308 and the process goes to step 220.

The time period can be extended based on various criteria, such as based on input from the first communication session. The input from the first communication can be based on events detected by the event recognition module 121. For example, an event can be one or more words and/or phrases spoken during the first communication session, input from an agent extending the time period based a discussion that occurred in the first communication session, input from a supervisor who monitored the first communication session, a gesture made during the first communication session (by the agent and/or the customer), a document displayed during the first communication session, and/or the like.

The time period can be extended based on multiple events. For example, the time period can be extended by 12 hours based on a word spoken in the first communication session and extended by 12 hours based on input from an agent, resulting in the time period being extended by 24 hours.

If the type of disassociation is based on an issue in step 300, the password manager 141 determines in step 306 if the issue has been resolved. If the issue has not been resolved in step 306, the process repeats step 306. Otherwise, if the issue is resolved in step 306, the process goes to step 308 where the password manager 141 disassociates the first temporary password from the first dynamic communication address 143. The process then goes to step 220.

To illustrate, consider the following example. A customer calls into a contact center from a kiosk at a store for Company Z asking a question about Product M (step 216). An agent at the contact center working for Company Z resolves the customer's problem and logs that the issue with Product M has been resolved (step 306). Once the agent logs that the problem is resolved, the password manager 141 disassociates the first temporary password from the first dynamic communication address 143 (step 308).

The method for resolving the issue can be accomplished in other ways, such as based on a phrase spoken in the first communication session (e.g., "I guess that takes care of your problem"). The issue can be resolved based on input provided via an Interactive Voice Response (IVR) system when the call has ended. The issue in step 306 may also be resolved in conjunction with a time period. For example, if the issue is not resolved within 24 hours after the communication session, the password manager 141 will disassociate the first temporary password from the first dynamic communication address 143.

If the disassociation is based on the communication session being initiated or completed in step 300, the process determines in step 310 if the communication session has been initiated or completed. This step can be administered to whether the disassociation occurs when the communication session is initiated or when the communication session ends in step 310. If the communication session has not been initiated or completed in step 310, the process repeats step 310. Otherwise, if the communication session has been initiated or completed (depending on which type has been administered), the process goes to step 312 or alternatively to step 308. The process goes to step 308 if the only type of disassociation is based on if the communication session has been initiated or completed.

If the process goes to step 312, the process determines if a time period has expired. The time period can start based on the initiation of the communication session, based on the completion of the communication session, based on an event that occurs within the communication session, and the like. The time period in step 312 may allow a user of a non-enterprise communication endpoint 102 to make or receive additional calls during the time period. In one embodiment, the time period may only allow a communication session(s) to be initiated from the enterprise communication endpoint 101 to the non-enterprise communication endpoint 102 during the time period. Alternatively, the time period may allow the user of the non-enterprise communication endpoint 102 to initiate one additional communication session to the enterprise communication endpoint 101 during the time period.

In another embodiment, the time period may allow the user of the non-enterprise communication endpoint 102 to only make additional communication sessions using a different medium. For example, if the initial call was a voice communication session, the time period may allow the user to make an Instant Messaging or email communication session with an Agent in a contact center during the time period. In one embodiment, the requirement of a different medium may be extended to only a defined number of communication sessions and/or incoming or outgoing communication sessions (this could be a specific number of incoming or outgoing communication sessions).

If the time period has not expired in step 312, the process repeats step 312. If the time period has expired, the process may go to step 308 or step 314 depending on how the system has been administered. If the process goes to step 308, the process disassociates the first temporary password from the first dynamic communication address 143.

If the process goes to step 314, the process determines in step 314 if a second temporary password needs to be used. If a second temporary password does not need to be used in step 314, the process goes to step 308 and disassociates the first temporary password from the first dynamic communication address 143. If the process determines in step 314 that a second temporary password in needed, the process disassociates the first temporary password from the first dynamic communication address 143 in step 316. The process sends a second temporary password that is associated with a second dynamic communication address 143 to the non-enterprise communication endpoint 102 in step 318. In one embodiment, the second dynamic communication address 143 may be the first dynamic communication address 143. A second communication session is established between the non-enterprise communication endpoint 102 and the enterprise communication endpoint 101 in step 320 in a similar manner as described above in FIG. 2. The process then disassociates the second temporary password from the second dynamic communication address 143 in step 322. Step 322 may use the same process described in FIG. 3 (i.e., starting at step 300 to disassociate the second dynamic communication address 143). The process then goes to step 220.

In the above description for FIG. 3, the processes are defined in a specific order. However, each of the different types of disassociation can be used in various combinations. For example, step 312 may be omitted from the process in FIG. 3. Alternatively, step 304 may be used in conjunction with step 306. Steps 316-322 may be used in conjunction with step 302, 304, and/or 306. One of skill in the art would readily recognize that other combinations of the different steps in FIG. 3 are possible.

Figure 4:
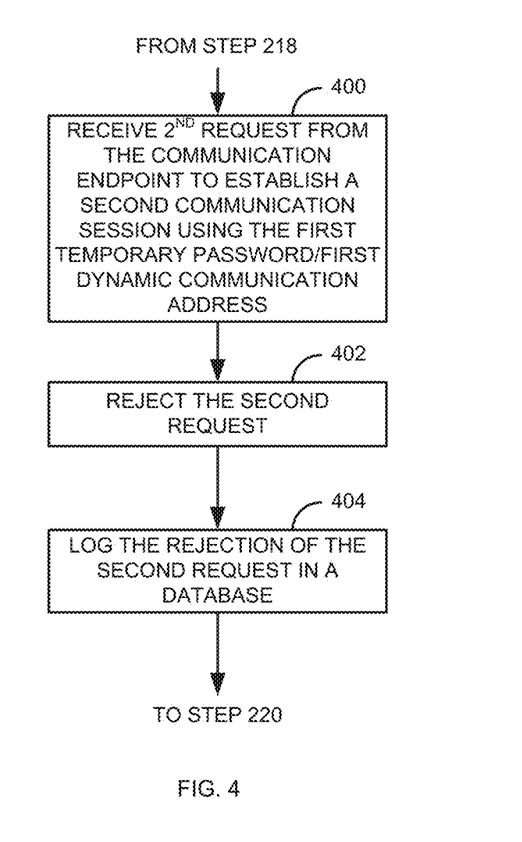
FIG. 4 is a flow diagram of a process for rejecting communications sessions that use a disassociated temporary password.

FIG. 4 is a flow diagram of a process for rejecting communications sessions that use a disassociated temporary password. After the first temporary password has been disassociated from the first dynamic communication address 143 in step 218, the communication system 120 receives a second request from the non-enterprise communication endpoint 102A to establish a second communication session using the first temporary password and the first dynamic communication address 143 in step 400. The second request is rejected in step 402 because the first temporary password is no longer associated with the first dynamic communication address. The rejection of the second communication session is logged in the database 142. The process then ends in step 220.

Figure 5:
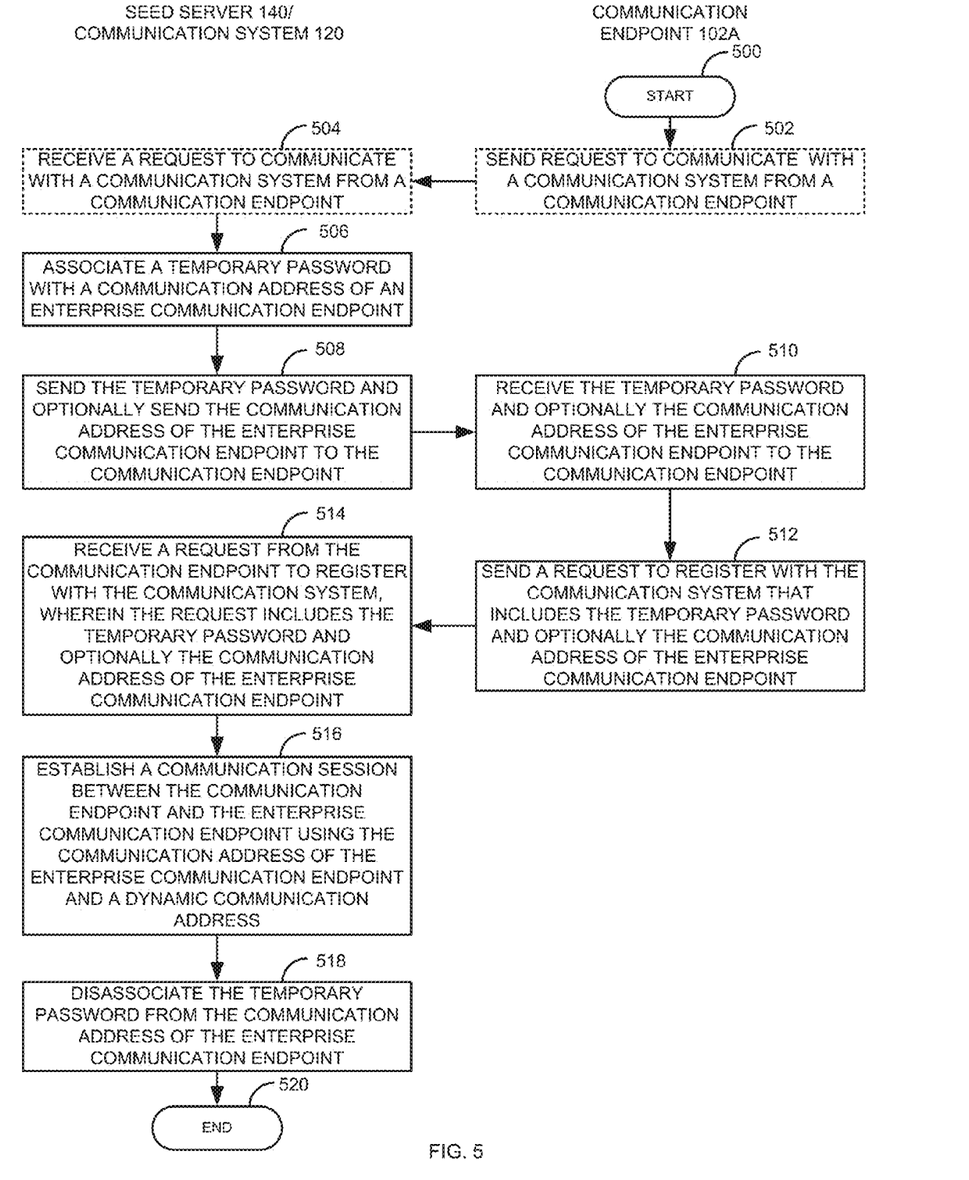
FIG. 5 is a flow diagram of a process for assigning a temporary password to an enterprise communication address.

FIG. 5 is a flow diagram of a process for assigning a temporary password to an enterprise communication address. The process starts in step 500. The non-enterprise communication endpoint 102A optionally sends a request to communicate with the communication system 120 in step 502. The password manager 141 optionally receives a request from the non-enterprise communication endpoint 102A to communicate with the communication system 120 in step 504. Steps 502 and 504 are optional because the password manager 141 may start the process beginning at step 506.

The password manager 141 associates a temporary password with a communication address of the enterprise communication endpoint 101B in step 506. The password manager 141 can associate the temporary password with a specific non-enterprise communication endpoint 102A based on the user selecting a specific type of service. For example, a user of the non-enterprise communication endpoint 102A via the application 103A selects that she wants service for product X. The application 103A sends information indicating that the user of the non-enterprise communication endpoint 102A wants service for product X. The password manager 141 associates the temporary password with the enterprise communication endpoint 101B because an agent that currently uses the enterprise communication endpoint 101B handles product X. Thus, the password manager 141 limits the use of the communication system 120 with a specific enterprise communication endpoint 101B. In one embodiment, the enterprise endpoint 101 can be a phone number/address of a queue where calls wait for the agent to become available.

The password manager 141 sends the temporary password and optionally the communication address of the enterprise communication endpoint 101B to the non-enterprise communication endpoint 102A in step 508. The non-enterprise communication endpoint 102A receives the temporary password and optionally the communication address of the enterprise communication endpoint 101B in step 510. The non-enterprise communication endpoint 102A sends a request to register with the communication system 120 that includes the temporary password and optionally the communication address of the enterprise communication endpoint 101B in step 512.

The communication system 120 receives the request from the non-enterprise communication endpoint 102A to register with the communication system 120 in step 514. The request includes the temporary password and optionally the communication address of the enterprise communication endpoint 101B. A communication session is established between the non-enterprise communication endpoint 102A and the enterprise communication endpoint 101B using the communication address of the enterprise communication endpoint 101B and a dynamic communication address 143 in step 516. The communication session may be initiated to the non-enterprise communication endpoint 102A or from the non-enterprise communication endpoint 102A.

The password manager 141 disassociates the temporary password from the communication address of the enterprise communication endpoint 101B in step 518. The process then ends in step 520. The disassociation process described in step 518 can be accomplished in a similar manner as described in FIG. 3. Likewise, the process of rejecting a second request using a disassociated temporary password in FIG. 4 can be used with the process described in FIG. 5.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising:
a microprocessor; and
a computer readable medium, coupled with the microprocessor and comprising microprocessor readable and executable instructions that program the microprocessor to execute:
a password manager that associates a first temporary password with a first dynamic communication address, sends the first temporary password and the first dynamic communication address to a non-enterprise communication endpoint, and disassociates the first temporary password from the first dynamic communication address, wherein the first temporary password is disassociated from the first dynamic communication address based on a time period that allows a second communication session to be initiated only from the enterprise communication endpoint to the non-enterprise communication endpoint within the time period; and
a communication system that receives a first request from the non-enterprise communication endpoint to register with the communication system, wherein the first request includes the first temporary password and the first dynamic communication address, and establishes a first communication session between the non-enterprise communication endpoint and an enterprise communication endpoint using the first dynamic communication address.

2. The system of claim 1, wherein the time period is extended based on input from the first communication session.

3. The system of claim 2, wherein the input from the first communication session that extends the time period is at least one of the following:
(i) one or more words and/or phrases spoken during the first communication session;
(ii) input from an agent extending the time period based a discussion that occurred in the first communication session;
(iii) input from a supervisor who monitored the first communication session;
(iv) a gesture made during the first communication session; or
(v) a document displayed during the first communication session.

4. The system of claim 1, wherein the first temporary password is disassociated from the first dynamic communication address based on an agent resolving one or more issues with a customer in the first communication session.

5. The system of claim 1, wherein the first temporary password is disassociated from the first dynamic communication address when the first communication session has been completed or when the first communication session is established.

6. The system of claim 5, wherein:
the password manager sends a second temporary password associated with a second dynamic communication address to the non-enterprise communication endpoint based on input from the first communication session; and
the communication system establishes a second communication session between the non-enterprise communication endpoint and the enterprise communication endpoint using the second dynamic communication address.

7. The system of claim 1, wherein the first temporary password is disassociated from the first dynamic communication address based on the first communication session being completed or when the first communication session is established, and based on a time period that only allows one additional communication session to be initiated from the non-enterprise communication endpoint to the enterprise communication endpoint within the time period.

8. The system of claim 1, wherein the communication system receives a request from the non-enterprise communication endpoint to establish a second communication session with the enterprise communication endpoint using the first dynamic communication address after the first temporary password has been disassociated with first dynamic communication address, rejects the second request to establish the second communication, and logs the rejection of the second request in a database.

9. A method comprising:
associating, by a microprocessor, a first temporary password with a first dynamic communication address;
sending, by the microprocessor, the first temporary password address to a non-enterprise communication endpoint;
sending, by the microprocessor, the first dynamic communication address to the non-enterprise communication endpoint;
receiving, by the microprocessor, a first request, from the non-enterprise communication endpoint, to register with a communication system, wherein the first request includes the first temporary password and the first dynamic communication address;
establishing, by the microprocessor, a first communication session between the non-enterprise communication endpoint and an enterprise communication endpoint using the first dynamic communication address; and
disassociating, by the microprocessor, the first temporary password from the first dynamic communication address, wherein the first temporary password is disassociated from the first dynamic communication address based on a time period that allows a second communication session to be initiated only from the enterprise communication endpoint to the non-enterprise communication endpoint within the time period.

10. The method of claim 9, wherein the time period is extended based on input from the first communication session.

11. The method of claim 10, wherein the input from the first communication session that extends the time period is at least one of the following:
(i) one or more words and/or phrases spoken during the first communication session;
(ii) input from an agent extending the time period based a discussion that occurred in the first communication session;
(iii) input from a supervisor who monitored the first communication session;
(iv) a gesture made during the first communication session; or
(v) a document displayed during the first communication session.

12. The method of claim 9, wherein the first temporary password is disassociated from the first dynamic communication address based on an agent resolving one or more issues with a customer in the first communication session.

13. The method of claim 9, wherein the first temporary password is disassociated from the first dynamic communication address when the first communication session has been completed or when the first communication session is established.

14. The method of claim 9, wherein the first temporary password is disassociated from the first dynamic communication address when the first communication session has been completed or when the first communication session is established, and further comprising:
   sending, by the microprocessor, a second temporary password associated with a second dynamic communication address to the non-enterprise communication endpoint based on input from the first communication session; and
   establishing, by the microprocessor, a second communication session between the non-enterprise communication endpoint and the enterprise communication endpoint using the second dynamic communication address.

15. The method of claim 9, further comprising:
   after the first temporary password has been disassociated with first dynamic communication address, receiving, by the microprocessor, a request from the non-enterprise communication endpoint to establish a second communication session with the enterprise communication endpoint using the first dynamic communication address;
   rejecting, by the microprocessor, the second request to establish the second communication; and
   logging, by the microprocessor, the rejection of the second request in a database.

16. A system comprising:
   a microprocessor; and
   a computer readable medium, coupled with the microprocessor and comprising microprocessor readable and executable instructions that program the microprocessor to execute:
   a password manager that associates a temporary password with a communication address of an enterprise communication endpoint, sends the temporary password to a non-enterprise communication endpoint, and disassociates the temporary password from the communication address of the enterprise communication endpoint, wherein the temporary password is disassociated from the communication address based on a time period that only allows one additional communication session to be initiated from the non-enterprise communication endpoint to the enterprise communication endpoint within the time period; and
   a communication system that receives a request from the non-enterprise communication endpoint to register with the communication system, wherein the request includes the temporary password, and establishes a first communication session between the non-enterprise communication endpoint and an enterprise communication endpoint using the communication address of the enterprise communication endpoint.

17. The system of claim 16, wherein the time period is extended based on input from the first communication session.

18. The system of claim 17, wherein the input from the first communication session that extends the time period is one of the following:
   (vi) one or more words and/or phrases spoken during the first communication session;
   (vii) input from an agent extending the time period based a discussion that occurred in the first communication session;
   (viii) input from a supervisor who monitored the first communication session;
   (ix) a gesture made during the first communication session; or
   (x) a document displayed during the first communication session.

19. The system of claim 16, wherein:
   the password manager sends a second temporary password associated with a second dynamic communication address to the non-enterprise communication endpoint based on input from the first communication session; and
   the communication system establishes a second communication session between the non-enterprise communication endpoint and the enterprise communication endpoint using the second dynamic communication address.

20. The system of claim 16, wherein the communication system receives a request from the non-enterprise communication endpoint to establish a second communication session with the enterprise communication endpoint using the first dynamic communication address after the first temporary password has been disassociated with first dynamic communication address, rejects the second request to establish the second communication, and logs the rejection of the second request in a database.

* * * * *

UNITED STATES PATENT AND TRADEMARK OFFICE
CERTIFICATE OF CORRECTION

PATENT NO. : 9,779,231 B2  Page 1 of 1
APPLICATION NO. : 14/504143
DATED : October 3, 2017
INVENTOR(S) : Joann Ordille et al.

It is certified that error appears in the above-identified patent and that said Letters Patent is hereby corrected as shown below:

In the Specification

At Column 2, Line 22, please delete "14/308,515" and replace it with --14/309,515-- therein.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*